United States Patent
Laske, Jr.

(10) Patent No.: US 6,662,746 B2
(45) Date of Patent: Dec. 16, 2003

(54) BIRD FEEDER

(76) Inventor: Lawrence L. Laske, Jr., 207 Carroll SE., Grand Rapids, MI (US) 49506

( * ) Notice: Subject to any disclaimer, the term of this patent is extended or adjusted under 35 U.S.C. 154(b) by 0 days.

(21) Appl. No.: 10/123,365

(22) Filed: Apr. 16, 2002

(65) Prior Publication Data

US 2002/0157615 A1 Oct. 31, 2002

Related U.S. Application Data

(60) Provisional application No. 60/286,545, filed on Apr. 26, 2001, and provisional application No. 60/307,719, filed on Jul. 25, 2001.

(51) Int. Cl.$^7$ ............................................. A01K 61/02
(52) U.S. Cl. ................................... 119/57.8; 119/52.2
(58) Field of Search ......................... 119/57.8, 57.9, 119/52.1, 52.2, 52.4, 53, 432, 429, 469, 61, 52.3, 464, 465, 467, 468; D30/124, 128

(56) References Cited

U.S. PATENT DOCUMENTS

| | | | | | |
|---|---|---|---|---|---|
| D92,107 S | * | 4/1934 | Proctor | ................... | D30/124 |
| 2,383,732 A | * | 8/1945 | Niersbach | ................... | 119/52.4 |
| 2,683,440 A | * | 7/1954 | Klix | ................... | 119/57.8 |
| 3,017,859 A | * | 1/1962 | Stern | ................... | 119/57.8 |
| D200,778 S | * | 4/1965 | Pregont | ................... | D30/128 |
| 4,188,913 A | * | 2/1980 | Earl et al. | ................... | 119/57.9 |
| 4,327,669 A | * | 5/1982 | Blasbalg | ................... | 119/57.8 |
| 4,627,384 A | * | 12/1986 | Courteau | ................... | 119/537 |
| 4,798,172 A | * | 1/1989 | Clarke | ................... | 119/57.9 |
| 4,977,859 A | * | 12/1990 | Kilham | ................... | 119/52.2 |
| 5,044,319 A | * | 9/1991 | Blasbalg | ................... | 119/57.9 |
| 5,063,877 A | * | 11/1991 | Riggi | ................... | 119/52.2 |
| 5,191,857 A | * | 3/1993 | Boaz | ................... | 119/52.3 |
| 5,195,460 A | * | 3/1993 | Loken | ................... | 119/57.9 |
| D335,724 S | * | 5/1993 | Coffer | ................... | D30/110 |
| 5,291,855 A | * | 3/1994 | Laverty | ................... | 119/52.3 |
| 5,406,908 A | * | 4/1995 | Burleigh | ................... | 119/57.8 |
| 5,474,025 A | * | 12/1995 | Lee | ................... | 119/464 |
| D380,877 S | * | 7/1997 | McNaughton | ................... | D30/124 |
| 5,671,696 A | * | 9/1997 | Liethen | ................... | 119/57.8 |
| 5,829,382 A | * | 11/1998 | Garrison | ................... | 119/52.2 |
| 6,067,934 A | * | 5/2000 | Harwich | ................... | 119/57.8 |
| 6,213,054 B1 | * | 4/2001 | Marshall | ................... | 119/57.8 |
| 6,253,706 B1 | * | 7/2001 | Sloop | ................... | 119/57.9 |
| 6,332,427 B1 | * | 12/2001 | Coulson | ................... | 119/57.8 |
| 6,360,690 B1 | * | 3/2002 | Canby | ................... | 119/52.2 |

FOREIGN PATENT DOCUMENTS

DE             3314536      *   9/1985

* cited by examiner

*Primary Examiner*—Peter M. Poon
*Assistant Examiner*—David Parsley
(74) *Attorney, Agent, or Firm*—Pauley Petersen & Erickson

(57) ABSTRACT

A bird feeder having at least one landing area for providing activities to birds as the birds wait for an open feeding area. A plurality of various mechanical elements can be positioned with respect to the landing area to promote interaction between the waiting birds, and allows the birds to feed more ergonomically correct. The bird can choose an individual element and its relation with respect to that element, while feeding. A number of versatile elements and perching positions are available for the bird to feed, or just rest. The bird feeder design better accommodates feeding birds, due to the ergonomic and feeding position benefits.

13 Claims, 6 Drawing Sheets

BIRD FEEDER

CROSS REFERENCE TO RELATED APPLICATION

This application claims the benefit of U.S. Provisional Application No. 60/286,545, filed Apr. 26, 2001, and U.S. Provisional Application No. 60/307,719, filed Jul. 25, 2001, the disclosures of which are hereby incorporated by reference herein and made a part hereof, including but not limited to those portions which specifically appear hereinafter.

BACKGROUND OF THE INVENTION

1. Field of the Invention

This invention relates to a bird feeder having a plurality of mechanical elements which provide landing areas for perching and promote interaction between birds waiting for a feeding station to open for use.

2. Description of Related Art

Conventional bird feeders can be positioned with respect to a tree, for example, to provide a location where birds may stop and obtain seed or other feed. Many conventional bird feeders have a perch for the bird to rest upon as it eats from the feeder. However, such conventional bird feeders do not provide a location for other birds to rest or sit if the perch is occupied by a feeding bird. Additionally, such conventional feeders provide no additional areas or activities to promote interaction between the birds waiting to feed.

There is an apparent need for a bird feeder which can accommodate more than one feeding bird.

These is an apparent need for a bird feeder which provides activities for birds waiting to feed and promotes interaction between the birds congregated at the bird feeder.

SUMMARY OF THE INVENTION

It is an object of this invention to provide a bird feeder having a plurality of feeding areas to accommodate more than one feeding bird, simultaneously.

It is another object of this invention to provide a bird feeder having at least one area providing activities for birds waiting to feed.

It is another object of this invention to provide a bird feeder having suitable mechanical elements to promote interaction between birds.

It is yet another object of this invention to provide a bird feeder having a means for supporting or suspending the bird feeder with respect to a tree, a ground surface or another support surface.

It is another object of this invention to provide an added performance value to the bird watcher, to promote true bird watching and provide excitement for the watcher with the anticipation of watching the "bird circus."

The above and other objects of this invention are accomplished with a bird feeder having at least one landing area for providing activities to birds as the birds wait for an open feeding area. A plurality of various mechanical elements can be positioned with respect to each landing area to promote interaction between the waiting birds.

Preferably, the bird feeder comprises a plurality of perches mounted with respect to a base. Each branch-like perch may extend radially outward from the base of the bird feeder and forms a landing area upon which birds may perch. Preferably, but not necessarily, the perch is generally tubular or cylindrical shaped to allow birds to rest comfortably upon the landing area.

In one preferred embodiment of this invention, at least one mechanical element is mounted with respect to a perch to provide activities for the birds waiting to feed and to promote interaction between waiting birds. Further, mechanical elements can have a variety of different colors to provide visual activity to birds congregated about the bird feeder.

For example, a trapeze or swing-type mechanical element may be rotationally mounted with respect to at least one landing area. Preferably, but not necessarily, the swing is rotatable about the perch while supporting a weight of a bird positioned upon a seat of the swing. Further, a platform may be connected with respect to at least one perch to provide a support surface for birds to congregate around the bird feeder. The platform may be a ladder-type platform having a plurality of rungs or cross supports, or the platform may form a continuous support surface. The platform may be generally straight or the platform may have an arcuate shape. Preferably, the platform is removably mountable to at least one perch using any suitable mechanical connection. For example, in one preferred embodiment of this invention, the platform forms a plurality of projections which correspond with apertures formed in at least one perch to securely mount the platform with respect to the landing area. It is apparent that more than one mechanical element may be connected with respect to each perch.

A container, for example a feed tube, is mountable with respect to the base and preferably has a cylindrical or tubular shape. Preferably, but not necessarily, at least a portion of the container is formed of a transparent or translucent material. The container forms at least one dispensing opening from which a bird may eat the feed contained within the container. Preferably, but not necessarily, the number of dispensing openings corresponds to the number of perches. Thus, a bird can position itself at a perch and eat seed dispensed from a corresponding dispensing opening.

In one preferred embodiment of this invention, a top is removably positionable with respect to container to cover at least a portion of the container. Preferably, but not necessarily, at least a portion of the top is formed or fabricated from a transparent or translucent material. Preferably, the top forms at least one wall or ledge which contacts or interferes with at least one wall or ledge formed by the container to securely connect the top to the container. Further, an exterior surface of the container may form at least one projection which interferes with a guard ring to properly position the guard ring with respect to the container. At least a portion of the top and at least a portion of the guard ring preferably have a curved outer surface, for example a concave or convex outer surface, to deter or prevent unwanted animals and/or moisture from entering the interior of the container.

In one preferred embodiment of this invention, the base forms a pocket for receiving a support means which supports the bird feeder at a desired position. For example, a support post or pole may be positioned securely within the pocket to support a weight of the bird feeder. The support pole may be securely positioned with respect to the ground or another support surface, to maintain the bird feeder in a generally upward or vertical position.

In one preferred embodiment of this invention, a suspending wire or another suitable hanging or suspension means is received within the pocket to suspend the bird feeder from a support member, such as a tree limb or branch. The wire is positioned within the pocket and extends through the bird feeder, along a vertical axis of the bird feeder. A plug connected to an end portion of wire maintains a portion of wire within the pocket and supports a weight of bird feeder as it is suspended from the tree limb or another supporting member. A fastener can be used to suspend the bird feeder from a tree limb or another support member. Preferably, the fastener forms a plurality of apertures through which the wire may be fed to adjust for the tension applied to the fastener by the weight of the bird feeder and/or to adjust a length of the wire between the bird feeder and the support member, to maintain the bird feeder in a desired position with respect to the tree limb and/or the ground.

BRIEF DESCRIPTION OF THE DRAWINGS

The drawings show different features of a bird feeder according to preferred embodiments of this invention, wherein.

DETAILED DESCRIPTION OF PREFERRED EMBODIMENTS

Figure 1:
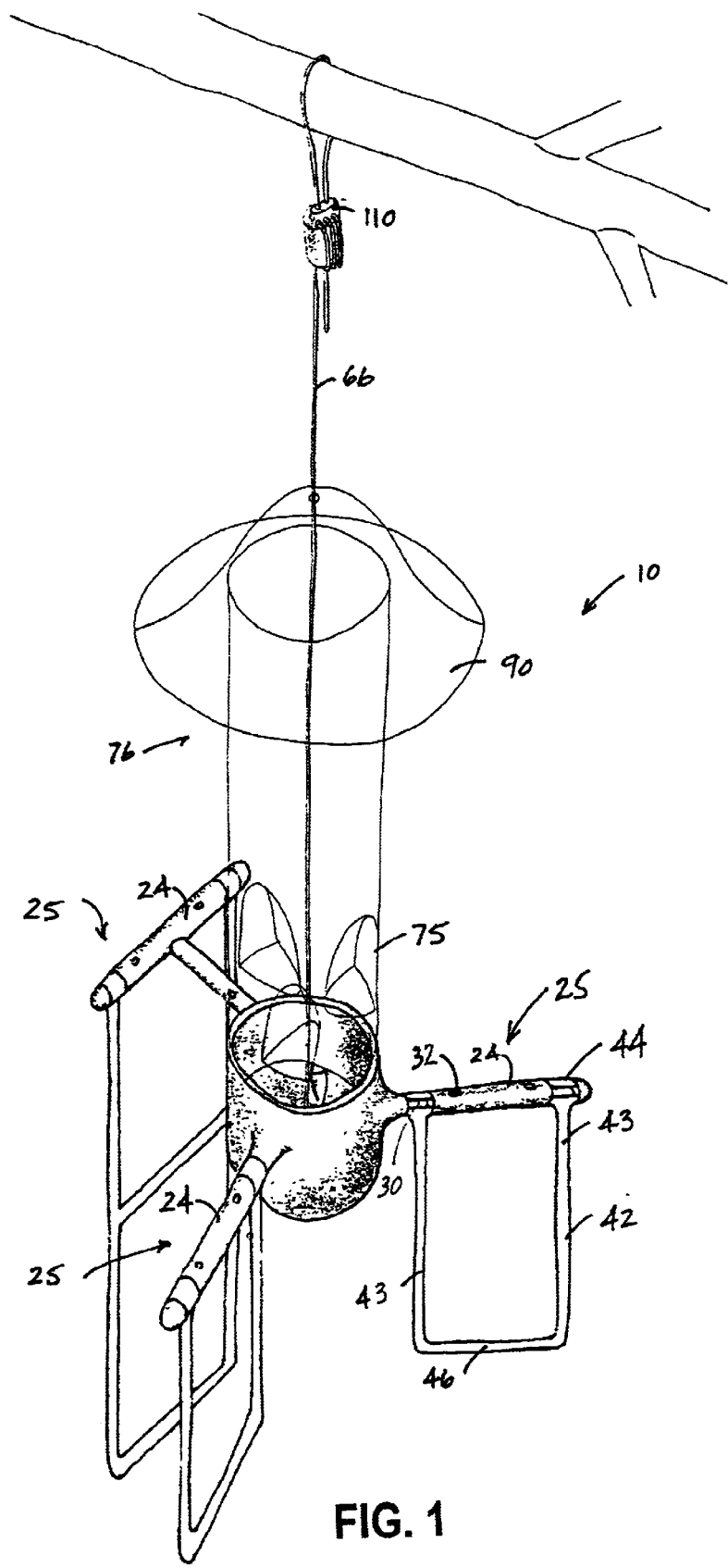
FIG. 1 is a perspective view of a bird feeder having a plurality of mechanical elements connected to a base, according to one preferred embodiment of this invention.
Figure 2:
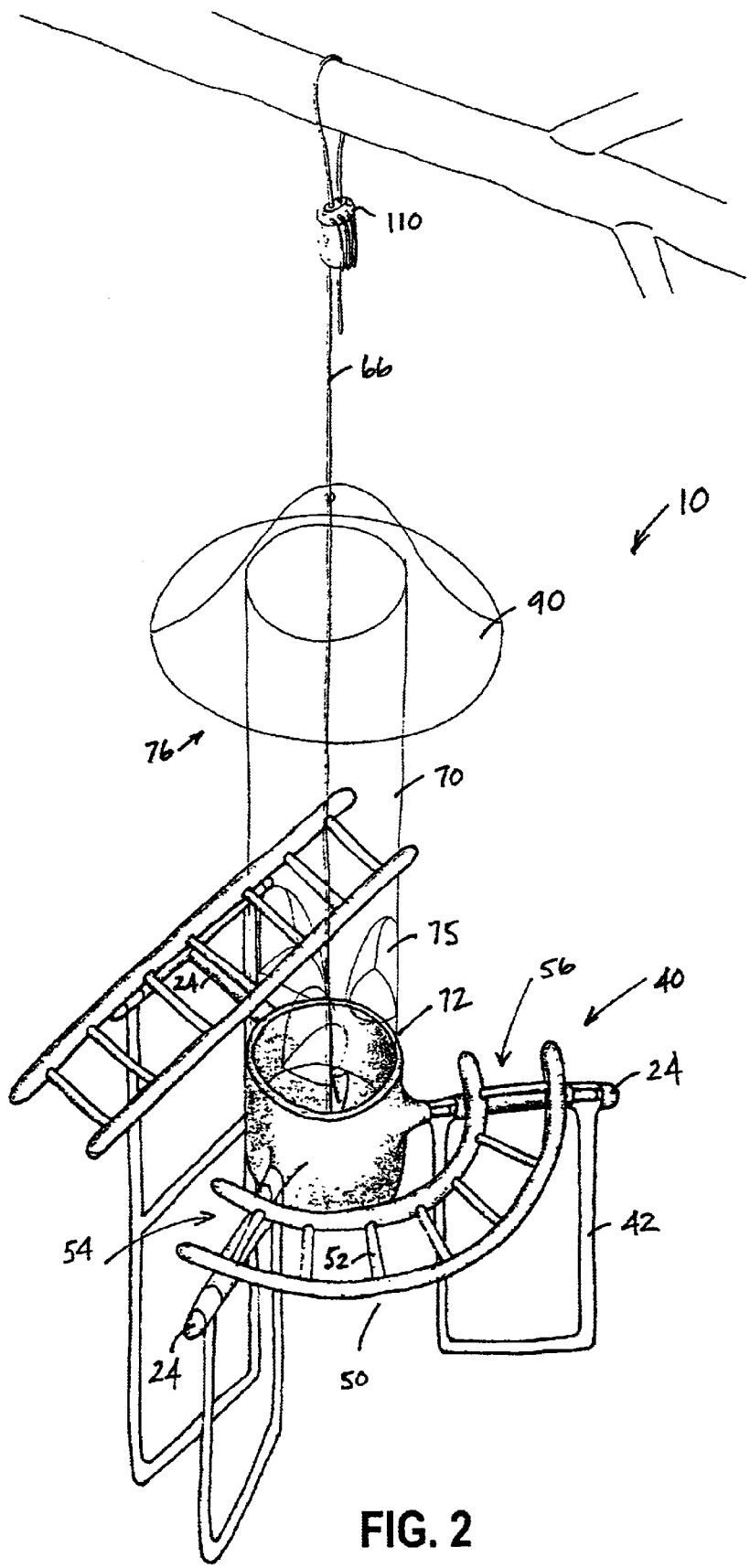
FIG. 2 is a perspective view of a bird feeder having a plurality of mechanical elements connected to a base, according to one preferred embodiment of this invention.
Figures 3, 3B:
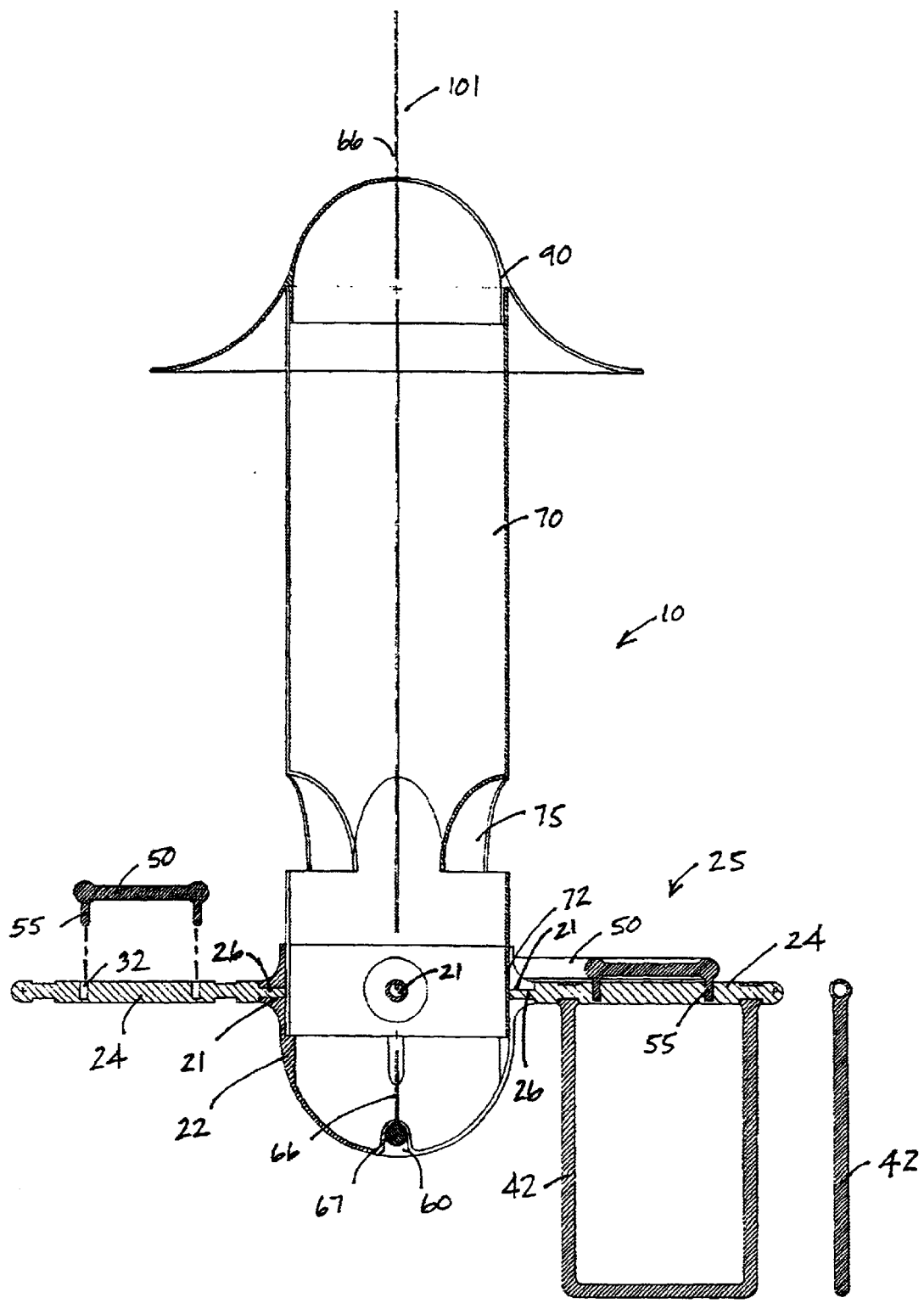
FIG. 3 is a partial cross-sectional view of a bird feeder, according to one preferred embodiment of this invention.
FIG. 3b is a cross-sectional side view of a mechanical element, according to one preferred embodiment of this invention.

Referring to FIGS. 1–6, a bird feeder 10, for holding and dispensing bird feed 100, for example seed, comprises a support structure or base 20. Base 20 may be formed or fabricated from any suitable material, such as a metal, an alloy, a plastic, or a composite material or any combination thereof. Preferably, base 20 is formed of a weather-resistant material. In one preferred embodiment of this invention, at least one perch 24 is mounted with respect to base 20. For example, three perches 24 may be mounted with respect to base 20, as shown in FIGS. 1–5. It is apparent that any number of perches 24 may be mounted with respect to base 20. Preferably, but not necessarily, each perch 24 is formed or integrated with base 20. Alternatively, base 20 may form a plurality of apertures 21 within which a perch 24 may be received. For example, as shown in FIG. 3, a projection 26 formed at a first end portion of perch 24 may be positioned within one aperture 21 formed in base 20. In one preferred embodiment of this invention, aperture 21 may have any suitable non-circular shape to prevent undesired rotation of perch 24 within aperture 21. For example, as shown in FIG. 3, aperture 21 has a keyway shape. Preferably, but not necessary, perch 24 is press-fit into aperture 21 to securely fix perch 24 with respect to base 20. It is apparent that perch 24 may be fixed or secured with respect to base 20 using any suitable mechanical fastener and/or adhesive.

In one preferred embodiment of this invention, perch 24 may comprise a branch-like tubular or cylindrical perch which extends radially outward from base 20 to form a platform or landing area 25. Landing area 25 may have any suitable size and shape. Preferably, but not necessarily, at least a portion of landing area 25 has a generally tubular or cylindrical shape to allow birds to rest comfortably upon landing area 25. Landing area 25 allows a bird to position itself with respect to a dispensing opening 75 formed in bird feeder 10 to feed. In certain preferred embodiments of this invention, perch 24 may form a T-shaped extension, for example as shown in FIGS. 1 and 2. The T-shape extension allows the bird to position itself comfortably with respect to a dispensing opening 75. For example, the bird can position itself directly forward to dispensing opening 75, without twisting or contouring its body, while further allowing the bird to move left or right with respect to dispensing opening 75 to allow for individualized comfort of the bird.

In one preferred embodiment of this invention, each perch 24 may form a plurality of depressions or indentations 30 and/or a plurality of apertures 32 for receiving various mechanical elements 40. Mechanical elements 40 may be formed or fabricated from any suitable material such as a metal, an alloy, a plastic or a composite material, or any combination thereof. Preferably, mechanical elements 40 are formed of a lightweight weather-resistant material, such as a plastic or composite material capable of supporting several birds simultaneously. Further, mechanical elements can have a variety of different colors to provide visual activity to birds perched on landing area 25.

For example, as shown in FIG. 1, at least one trapeze or swing-type mechanical element 40 may be rotationally or pivotally mounted with respect to landing area 25. Preferably, but not necessarily, swing 42 comprises opposing arms 43 each having an end portion 44 which is connectable to perch 24 at depression 30. In certain preferred embodiments, opposing arms 43 may join together or converge to attach or connect to perch 24 at one connection point or depression 30. Further, it is apparent that end portion 44 may be rotationally mounted to perch 24 using any suitable mechanical connection. For example, end portion 44 may form a semicircular collar or clamp which can be press-fit onto perch 24 so that swing 42 is rotatable about perch 24 while supporting a weight of a bird positioned upon a seat 46 of swing 42. Preferably, but not necessarily, at least one swing 42 connected with respect to landing area 25 comprises more than one seat 46, such as shown in FIGS. 1 and 2, to promote interaction between birds perched at landing area 25. For example, a weight of one bird perched on one seat 46 directly affects interaction with another bird positioned on a second seat 46, either about or below the first bird.

Alternatively, or in addition to at least one swing 42, as shown in FIG. 2, a platform 50 may be mounted with respect to landing area 25, for example to provide a support surface for birds to congregate around bird feeder 10. As shown in FIG. 2, platform 50 may comprise a plurality of cross supports 52 which form a ladder-type platform 50. Platform 50 allows at least one bird to position itself to feed or to move about bird feeder 10 freely. Platform 50 may be removably connected to at least one landing area 25 using any suitable mechanical connection. For example, in one preferred embodiment of this invention, platform 50 forms a plurality of projections or dimples 55, as shown for example in FIG. 4. Projections 55 correspond with apertures 32 formed in perch 24 to securely mount platform 50 to perch 24. In certain preferred embodiments, platform 50 may have an arcuate shape whereby a first end portion 54 is connected to one perch 24 and a second end portion 56 is connected to a second perch 24 to from an extended landing area 25, as shown in FIG. 2. Platform 50 may extend about only a portion of an outer surface of base 20 or in certain preferred embodiments of this invention, platform 50 may form a continuous ring positioned about the outer surface of base 20. Further, as shown in FIG. 2 for example, more than one mechanical element 40 may be connected with respect to each perch 24.

In one preferred embodiment of this invention, base 20 forms a pocket 60 for receiving a support means for supporting bird feeder 10 at a desired position. For example, a support post or pole 62 may be positioned securely within pocket 60 to support a weight of bird feeder 10 at a first end portion 63 of support post 62. A second end portion (not shown) of support pole 62 may be securely positioned with respect to the ground or another support surface to preferably maintain bird feeder 10 in a generally upward position.

Bird feeder 10 further comprises a feed tube 70 positionable with respect to base 20. Preferably, but not necessarily, feed tube 70 has a tubular or cylindrical shape having a first end portion 72 which is mountable with respect to base 20. It is apparent that feed tube 70 may have any suitable configuration or comprise any suitable container. For example, feed tube 70 may have a circular, rectangular or triangular cross-sectional shape and may have any suitable length and volume. First end portion 72 may be connected to base 20 or may be integrated with base 20. In one preferred embodiment of this invention, as shown for example in FIG. 3, first end portion 72 is positionable within base 20. A surface 22 formed in base 20 interferes with first end portion 72 to position feed tube 70 with respect to base 20. As shown in FIG. 3, at least a portion of the first end portion 72 rests or sits on surface 22. Preferably, but not necessarily, at least a portion of feed tube 70 is formed of a transparent or translucent material, for example a plastic material. It is apparent that feed tube 70 may be formed or fabricated using any suitable material.

As shown in FIGS. 1–5, feed tube 70 forms at least one dispensing opening 75. In one preferred embodiment of this invention, the number of dispensing openings 75 corresponds to the number of perches 24. For example, as shown in FIG. 1, one dispensing opening 75 is positioned with respect to a corresponding perch 24. Thus, a bird can perch at landing area 25 and eat seed dispensed from corresponding dispensing opening 75. Preferably, a portion of feed tube 70 forming each dispensing opening 75 comprises a surface or hood which extends into an interior of feed tube 70 to contain feed 100 within feed tube 70 until a bird removes feed 100 from within feed tube 70 through one dispensing opening 75.

Figure 4:
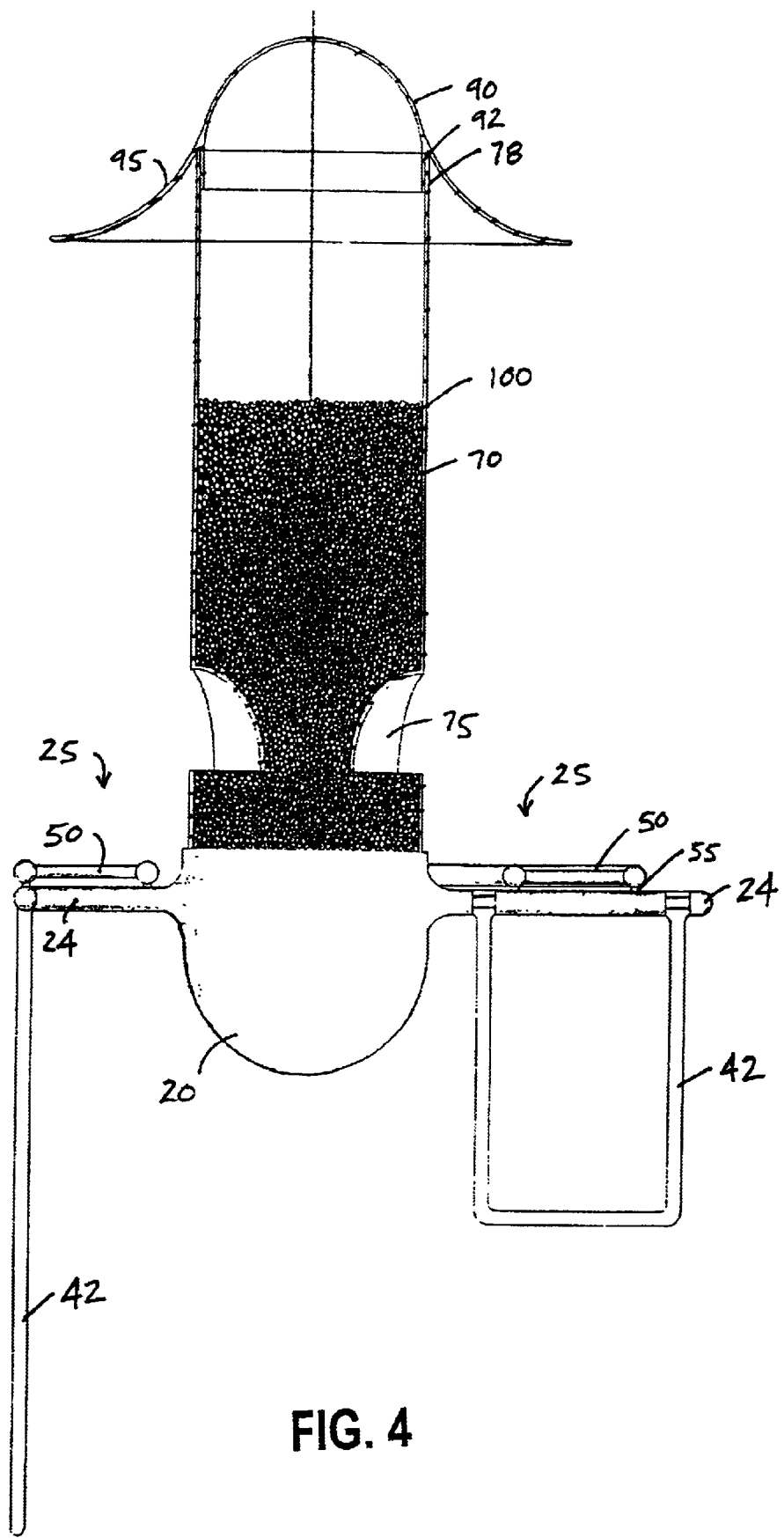
FIG. 4 is a partial cross-sectional view of a bird feeder, according to one preferred embodiment of this invention.
Figure 5:
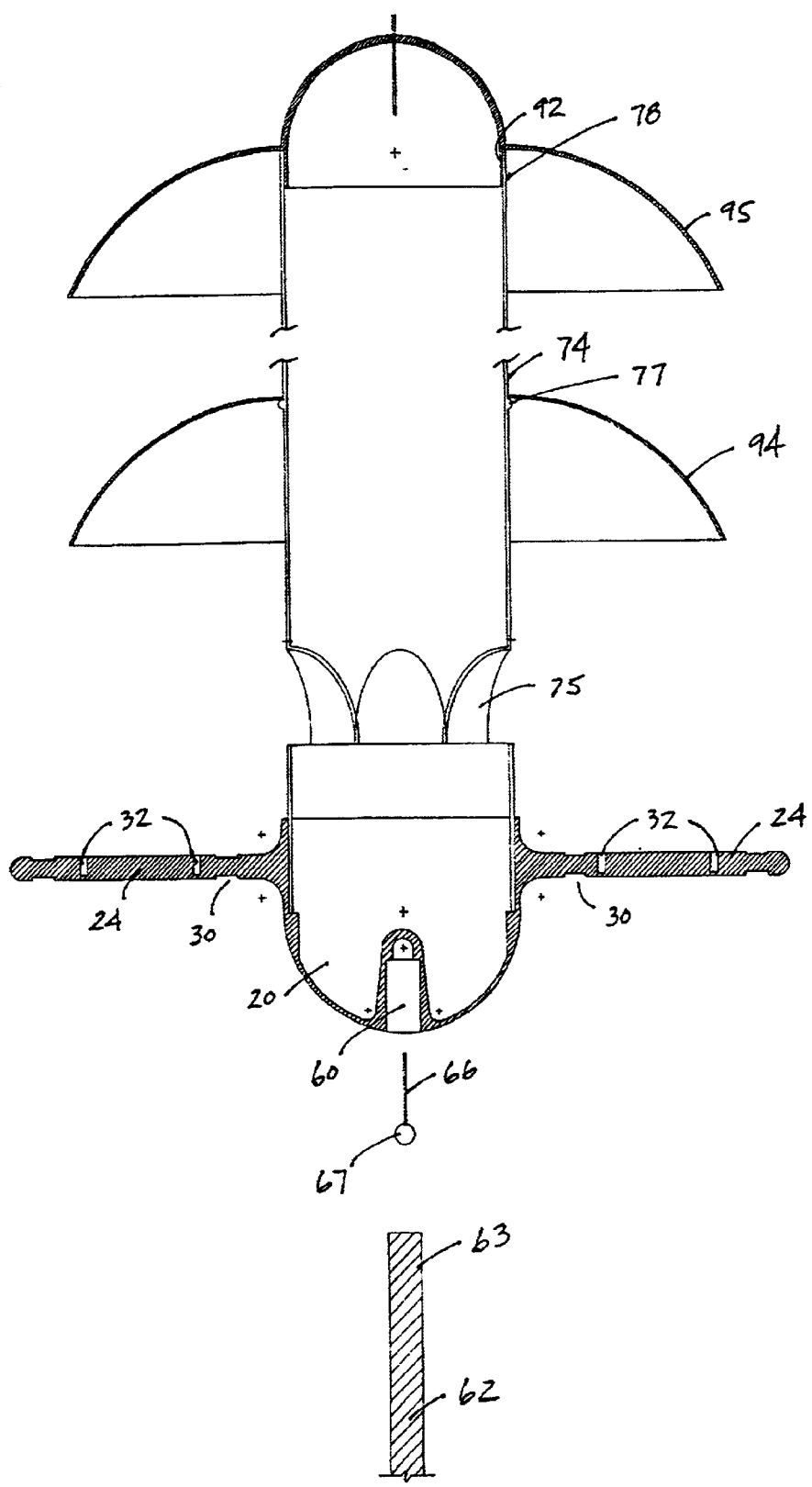
FIG. 5 is a cross-sectional view of a bird feeder, according to one preferred embodiment of this invention.
Figure 6:
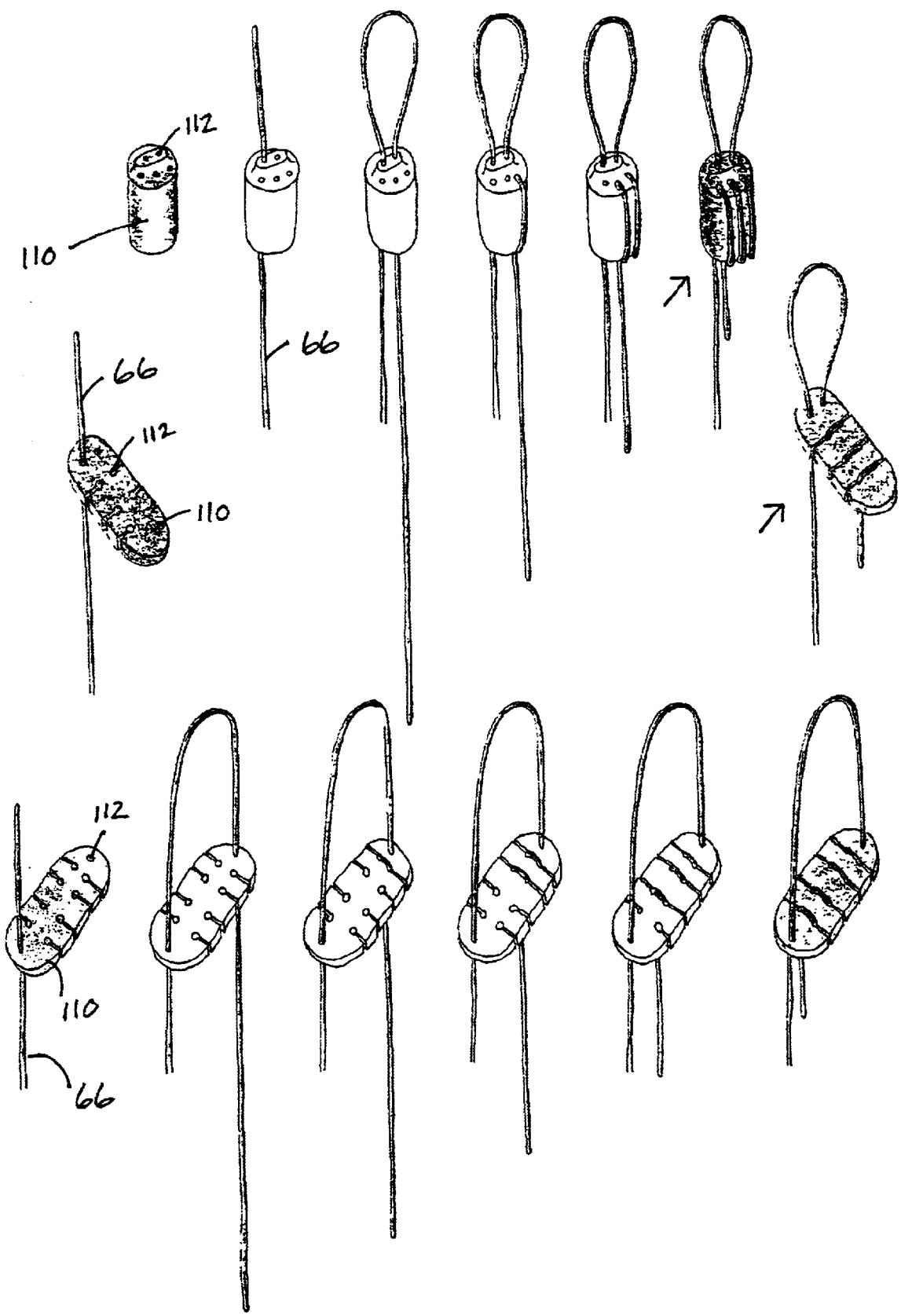
FIG. 6 illustrates various mechanical fasteners, each in a perspective view, for suspending a bird feeder with respect to a support member, according to one preferred embodiment of this invention.

Referring to FIGS. 4 and 5, bird feeder 10 further comprises a top 90 which is removably positionable with respect to feed tube 70 to enclose feed tube 70 to prevent unwanted animals and/or moisture from entering the interior of feed tube 70. Top 90 can be formed or fabricated using any suitable material, such as a metal, an alloy, a plastic or a composite, and any combination thereof. Preferably, but not necessarily, at least a portion of top 90 is formed or fabricated from a transparent or translucent material. In one preferred embodiment of this invention, top 90 forms at least one wall 92 which contacts or interferes with at least one wall or ledge 78 formed by feed tube 70 to securely connect top 90 to feed tube 70. It is apparent that wall 92 and/or ledge 78 may comprise a continuous wall or ledge or may comprise a segmented wall or ledge.

In one preferred embodiment of this invention, a guard ring 94 is positionable about an exterior surface 74 of feed tube 70, in order to further prevent or deter unwanted animals or moisture from entering the interior of feed tube 70. Preferably, but not necessarily, exterior surface 74 forms at least one, preferably a plurality of projections 77, which interfere with guard ring 94 to position guard ring 94 with respect to a second end portion 76 of feed tube 70, as shown in FIG. 5.

An outer surface 95 of top 90 may have a general concave shape, as shown in FIG. 4, or a general convex shape, as shown in FIG. 5. Curved outer surface 95, whether concave or convex, prevents or deters unwanted animals, such as squirrels, from accessing feed 100 contained within the interior of feed tube 70 as well as prevents moisture, e.g. rain, from entering into the interior of feed tube 70. In one preferred embodiment of this invention, an outer surface of guard ring 94 has a shape the same or similar to the curved outer surface of top 90, whether concave or convex, to further prevent or deter unwanted animals from accessing feed 100 as well as prevent moisture from entering into the interior of feed tube 70.

In one preferred embodiment of this invention, a suspending wire 66 or another suitable hanging or suspension means is received within pocket 60 to suspend bird feeder 10 from a tree limb or another suitable support member. As shown in FIGS. 1–3, wire 66 is positioned within pocket 60 and extends through base 20 along a vertical axis 101 of bird feeder 10. Wire 66 may extend through the interior of feed tube 70 and through top 90. A plug 67 connected to an end portion of wire 66 maintains a portion of wire 66 within pocket 60 and supports a weight of bird feeder 10 as bird feeder 10 is suspended from the tree limb or another supporting member.

In one preferred embodiment of this invention, bird feeder 10 can be suspended from a tree limb using a fastener 110. Fastener 110 forms at least one aperture 112 for threading wire 66 through fastener 110. Preferably, fastener 110 forms a plurality of apertures 112 through which wire 66 may be fed to adjust for the tension applied to fastener 110 by the weight of bird feeder 10 and/or to adjust a length of wire 66 between bird feeder 10 and the support member, in order to maintain bird feeder 10 in a desired position with respect to the tree limb or another support member and/or the ground.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

I claim:

1. A bird feeder comprising:
   a base;
   a plurality of perches fixedly mounted to the base, each perch extending radially outwardly from the base along a longitudinal axis of the perch;
   at least one mechanical element mounted to each perch forming a plurality of landing areas, at least one mechanical element rotatable about the longitudinal axis of the perch;
   a horizontal ladder having a first end portion and a second end portion, and extending between a first perch and a second perch of the plurality of perches, the first end portion of the ladder being connected to the first perch and the second end portion of the ladder being connected to the second perch, with the first end portion of the ladder being press-fit to the first perch and the second end portion of the ladder being press-fit to the second perch;

a feed tube mounted with respect to the base, the feed tube forming a plurality of dispensing openings, each dispensing opening corresponding with one perch;

a top covering at least a portion of the feed tube, a wall formed by the top interfering with a ledge formed at a first end portion of the feed tube;

a guard ring positioned about an exterior surface of the feed tube, at least one projection formed by the exterior surface interfering with the guard ring at the first end portion of the feed tube; and a suspending wire positioned within a pocket formed by the base and extending through the bird feeder along a vertical axis of the bird feeder between the base and the top.

2. The bird feeder according to claim 1 wherein each perch is integrated with the base.

3. The bird feeder according to claim 1 wherein each perch is press-fit into an aperture formed by the base.

4. The bird feeder according to claim 1 wherein at least a portion of the feed tube is transparent.

5. The bird feeder according to claim 1 wherein at least a portion of the top is transparent.

6. The bird feeder according to claim 1 further comprising a support pole mounted within the pocket formed by the base.

7. The bird feeder according to claim 1 wherein a portion of the feed tube forming each dispensing opening extends into an interior of the feed tube.

8. The bird feeder according to claim 1 wherein at least a portion of the top is curved.

9. The bird feeder according to claim 1 wherein at least a portion of the top is concave.

10. The bird feeder according to claim 1 wherein at least a portion of the top is convex.

11. The bird feeder according to claim 1 wherein the feed tube forms at least one projection, the at least one projection interfering with the wall.

12. The bird feeder according to claim 1 wherein the at least one mechanical element comprises one of a ladder, a trapeze and a swing.

13. The bird feeder according to claim 1 wherein the first end portion of the ladder and the second end portion of the ladder each comprises at least one projection, each projection mountable within an aperture formed in the perch.

* * * * *